(12) United States Patent
Chesney, II

(10) Patent No.: US 6,900,742 B2
(45) Date of Patent: May 31, 2005

(54) LIGHT CONTROL MODULE FOR AVIATION OBSTRUCTION MARKING

(75) Inventor: Charles B. Chesney, II, Ft. Wayne, IN (US)

(73) Assignee: Little Circuits, Inc., Fort Wayne, IN (US)

( * ) Notice: Subject to any disclaimer, the term of this patent is extended or adjusted under 35 U.S.C. 154(b) by 0 days.

(21) Appl. No.: 10/351,660

(22) Filed: Jan. 24, 2003

(65) Prior Publication Data

US 2003/0156048 A1 Aug. 21, 2003

Related U.S. Application Data

(60) Provisional application No. 60/358,056, filed on Feb. 19, 2002.

(51) Int. Cl.[7] .............................................. B64D 47/00
(52) U.S. Cl. ..................... 340/983; 340/945; 340/981; 340/947; 340/948; 340/644
(58) Field of Search ................ 340/945, 947, 340/948, 981, 983, 644

(56) References Cited

U.S. PATENT DOCUMENTS

| | | |
|---|---|---|
| 3,488,558 A | 1/1970 | Grafton |
| 3,531,765 A | 9/1970 | Christianson et al. |
| 3,710,157 A | 1/1973 | Wright |
| 3,925,704 A | 12/1975 | Camic |
| 3,973,168 A | 8/1976 | Kearsley |
| 4,024,491 A | 5/1977 | Pellerin et al. |
| 4,037,191 A | 7/1977 | Deane et al. |
| 4,233,546 A | 11/1980 | Berthiaume |
| 4,375,633 A | 3/1983 | Bazzani et al. |
| 4,390,812 A | 6/1983 | Seidler |
| 4,449,073 A | 5/1984 | Mongoven et al. |
| 4,516,195 A | 5/1985 | Gonser |
| 4,613,847 A | 9/1986 | Scolari et al. |
| 4,755,804 A * | 7/1988 | Levati et al. ............... 340/642 |
| 5,032,961 A | 7/1991 | Pouyanne et al. |
| 5,095,502 A | 3/1992 | Finzel |
| 5,243,340 A | 9/1993 | Norman et al. |
| 5,264,761 A * | 11/1993 | Johnson ..................... 315/291 |
| 5,359,325 A | 10/1994 | Ford et al. |
| 5,426,429 A | 6/1995 | Norman et al. |
| 5,644,304 A | 7/1997 | Pavarotti et al. |
| 5,872,832 A | 2/1999 | Bishel et al. |
| 5,926,115 A | 7/1999 | Schleder et al. |
| 2002/0071226 A1 * | 6/2002 | Holce et al. .................. 361/23 |

* cited by examiner

Primary Examiner—Julie B. Lieu
(74) Attorney, Agent, or Firm—Baker & Daniels

(57) ABSTRACT

The present invention involves a lighting control module for at least one aviation obstruction light including a microcontroller, and switching means for selectively coupling the aviation obstruction light to a power source, the microcontroller coupled to the switching means and selectively activating the aviation obstruction light. The microcontroller has programming for sensing a master light controller such that if a master light controller is sensed, then the microcontroller coordinates activation of the aviation obstruction light with the master light controller, and if a master light controller is not sensed, then the microcontroller sends activation signals as a master light controller.

20 Claims, 11 Drawing Sheets

LIGHT CONTROL MODULE FOR AVIATION OBSTRUCTION MARKING

CROSS REFERENCE TO RELATED APPLICATIONS

This application is related to and claims the benefit under 35 U.S.C. § 119(e) of U.S. Provisional Application Ser. No. 60/358,056, entitled LIGHT CONTROL MODULE FOR AVIATION OBSTRUCTION MARKING, filed on Feb. 19, 2002.

BACKGROUND OF THE INVENTION

1. Field of Invention

The present invention relates to aviation obstruction lights, specifically the control of aviation obstruction lights for compliance with United States and international regulations.

2. Description of the Related Art

Aviation obstruction lights have been commonly used in conjunction with various aviation obstructions, such as radio and television broadcast towers and various telecommunications towers, buildings or other structures, and such aviation obstruction lights will become even more commonly used and seen as more broadcast and telecommunications towers are built. With the use of the aviation obstruction lights comes a need for controlling the lights to ensure that the lights are working properly and a need to control the light pattern produced by the aviation obstruction lights.

On a typical broadcast tower, there are more than one evenly spaced levels on the tower that require lighting. The top level is most often a flashing light. The next lower level is usually a steady-on light. The third level from the top flashes and the next is steady-on again. And so on. The flashing lights are normally required to be brighter by using higher wattage lamps. Often, all of the stead-on lights can be controlled by a single controller. Since the wattage is higher on the flashing lights, multiple controllers may be required here.

To minimize costs, obstruction lights that are intended to be steady-on are often wired directly to the power source via a relay that is activated by a remote day/night photocell. This short-cut technique has several serious disadvantages. First, when the lights are initially energized, the inrush of high current onto cold lights causes severe thermal stress on the filaments. Especially on cold days, incandescent lamp filaments are often destroyed when this occurs. A gradual means of illumination is much more desirable. A second disadvantage is that the expected wattage use must still be monitored by another peripheral means to comply with agency regulations. When an individual bulb has failed, the wattage use will be less and this condition must be detectable. Burned out lights must be replaced.

One previous approach to the control issue has been the use of a control system which utilizes a remote module located at each light with a group of remote modules being controlled by a main module and a main station located on a ring network (U.S. Pat. No. 5,644,304) or using a vault computer as a central control for remote and master control modules (U.S. Pat. No. 5,926,115). A problem with this structure is the size and numerosity of components, for example, many remote modules, main modules, and main stations are required in the ring network, and that components, such as the main stations or vault computers, are relatively large.

A secondary problem with the described structure is that troubleshooting of a problem with the control system becomes problematic since there are many components which may malfunction and even within the various components, there may be numerous wires and smaller components which need to be checked and double checked for problems. Also, with numerous components comes a higher cost for those components.

Yet another problem with the above-described structure is the complexity of the structure. Any time that a problem would occur with the control system, an engineer or technician would need to be required to come to the site of the control system and trouble shoot each component in order to even determine what is the problem before any solution could be implemented. The operator or the owner of the control system, such as the airport or the owner of the tower, would be unable to determine the problem or isolate the problem before calling upon a repair crew. Thus, this structure presents numerous problems which affect operation of the aviation obstruction lights.

Previous approaches also have the problem of when one portion of the network fails, the entire network or at least a larger portion of the network also fails, thereby resulting in inconvenience, from having a non-operating system, and potential monetary fines and other penalties imposed by the regulating authorities for having such a non-operating system. An associated problem exists when the portion that fails is a main station (U.S. Pat. No. 5,644,304) or a vault computer (U.S. Pat. No. 5,926,115) since the loss of those components could result in non-operation of a much larger portion of a network than the failure of a remote module or controller. When such a large component fails, the operation of the aviation obstruction lights needs to be interrupted by shutting down the network to facilitate repair or replacement of the failed components.

A control system for aviation obstruction lights which is not complicated, is less difficult to debug and which does not require expensive components or significant downtime would be desirable.

SUMMARY OF THE INVENTION

The present invention overcomes the above described shortcomings by providing a robust control system which utilizes independent modules which may control one or more aviation obstruction lights and which has a lower cost. This invention eliminates the need for the external relay, provides a gentle initial power application and provides the user with condition adjustable sensitivity to real time wattage use with bulb failure detection; all from a single, replaceable module. Furthermore, each module is provided with diagnostic indicator lights for ease of troubleshooting and each module can be replaced without interruption of the operation of the other aviation obstruction lights. Lastly, the modules are structured such that the failure of one does not result in the failure of all modules, rather, problems may be isolated to a single module.

The present invention provides a lighting control module for at least one aviation obstruction light including a microcontroller, and switching means for selectively coupling the aviation obstruction light to a power source, with the microcontroller coupled to the switching means and selectively activating the aviation obstruction light. The microcontroller has programming for sensing a master light controller such that if a master light controller is sensed, then the microcontroller coordinates activation of the aviation obstruction light with the master light controller, and if a master light controller is not sensed, then the microcontroller sends activation signals as a master light controller.

The present invention further provides a light control module for at least one aviation obstruction light including a microcontroller, and a triac coupled to the microcontroller and selectively coupling a power source and the aviation obstruction light. The microcontroller has programming for selectively activating the triac for only predetermined portions of the current from the power source.

The present invention further provides a method of controlling at least one aviation obstruction light including providing a programmable microcontroller, sensing by the microcontroller that a master light controller is present, coordinating activation of the aviation obstruction light with the master light controller, sensing by the microcontroller that a master light controller is not present, and sending activation signals as a master light controller.

The present invention further provides a method of controlling at least one aviation obstruction light including providing a programmable microcontroller, providing a triac coupled between a power source and the aviation obstruction light, determining the state of the aviation obstruction light by the microcontroller, and activating the triac for predetermined portions of the current from the power source when the aviation obstruction light is cold.

The present invention also provides a lighting control module for at least one aviation obstruction light including a microcontroller and switching means for selectively coupling the aviation obstruction to a power source with the microcontroller coupled to the switching means and selectively activating the obstruction light. The microcontroller has programming for receiving and transmitting signals between a user and the aviation obstruction light such that the status of the light is transmitted from the light to the user and the performance characteristics of the light are changed due to user directed input.

The present invention provides a lighting system for an aviation obstruction including at least one aviation obstruction light adapted to be mounted on the aviation obstruction, and a module controlling the aviation obstruction light. The module includes an enclosure, a microcontroller disposed within the enclosure, switching means for turning the light on and off coupled with the microcontroller and adapted to be coupled to an electrical power source, and a user-operated input means mounted on the enclosure and adapted to receive user entered input signals and to communicate the signals to the microcontroller.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
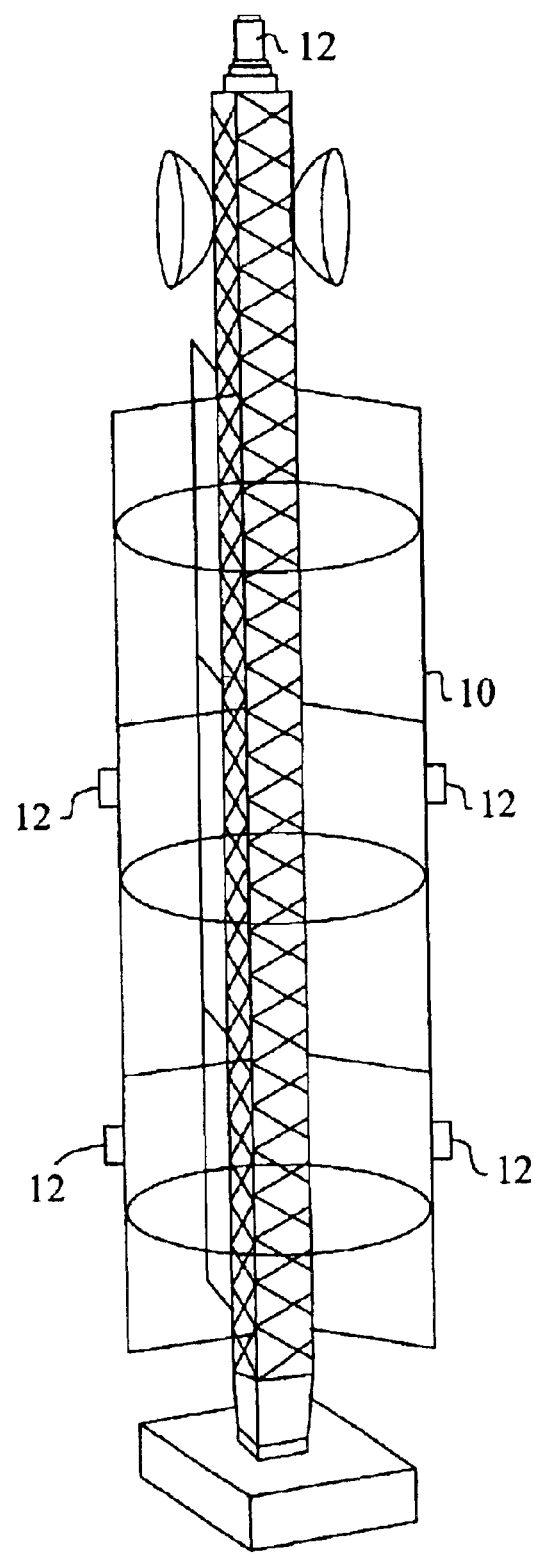
FIG. 1 is an exemplary tower having aviation obstruction lights upon which light control module is used in accordance with the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate particular embodiments of the invention such exemplifications are not to be construed as limiting the scope of the invention in any manner.

DETAILED DESCRIPTION OF THE INVENTION

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

FIG. 1 shows an exemplary aviation obstruction 10 as a communications tower. Included on obstruction, or tower, 10 is light 12 at the top thereof and a plurality of lights 12 along the sides of tower 10. As tower 10 is shown with a plurality of lights at the top and along the sides thereof, each of the lights 12 requires a control method or mechanism to produce a flashing or steady light pattern. Tower 10 may alternatively have only a single light 12 or have lights 12 located only at the top of tower 10 or along the sides thereof.

Located within easy access of the owner, or operator, of tower 10 is light control module 14 which controls one or more lights 12. In general, the number of modules required for each tower 10 will normally not exceed fifteen units and for the most part, will not exceed six units. The number of modules is dependent on the wattage capabilities of a particular configuration of control module 14, and the load of lights 12. As a result, in the particular implementation shown and described herein, a seven bit addressing format is used; however, other addressing formats, such as a ten bit addressing format may be used in conjunction with the modules.

Figure 2:
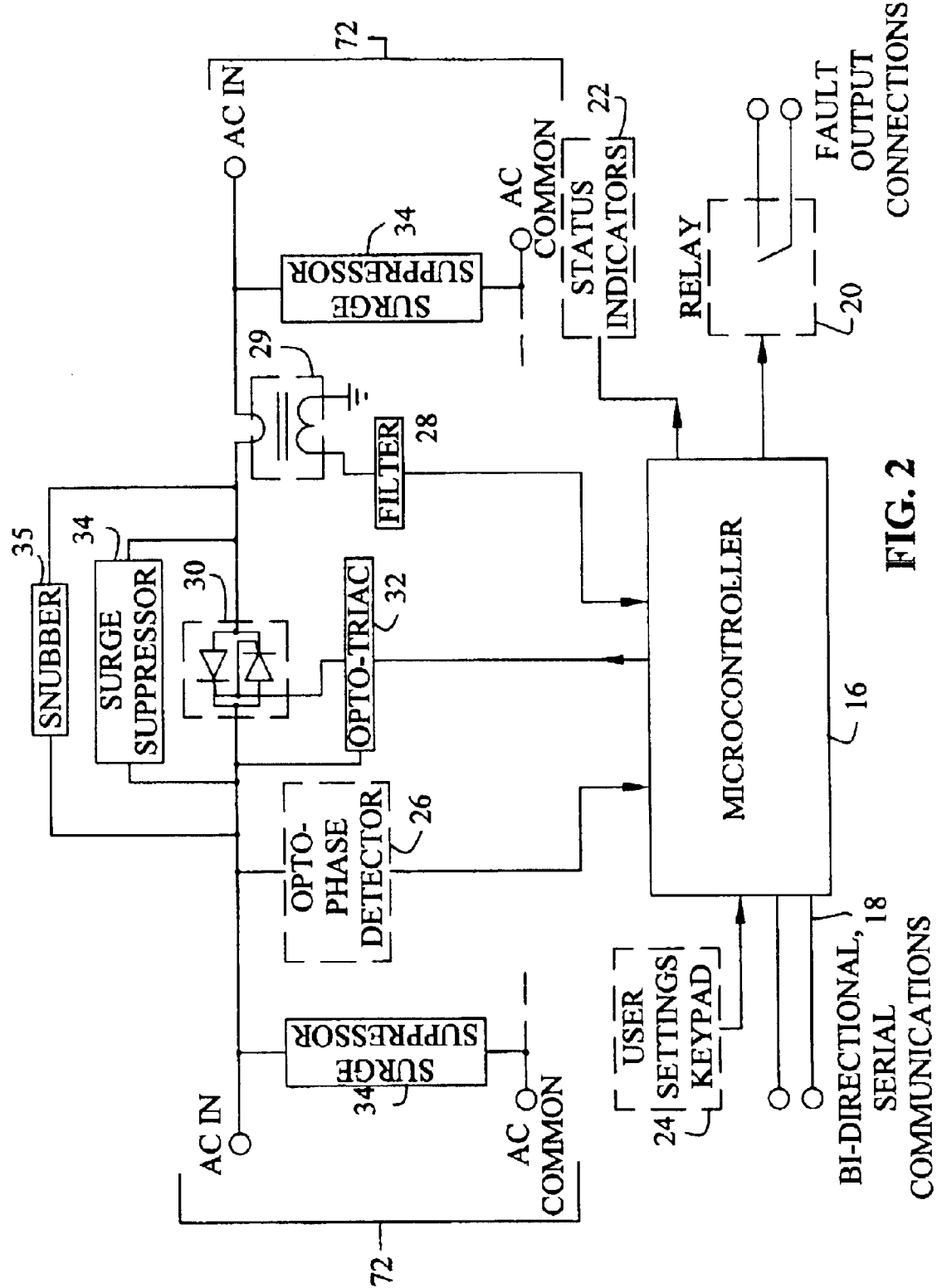
FIG. 2 is a functional block diagram of a light control module in accordance with the present invention.

FIG. 2 shows light control module 14 as including microcontroller 16 in communication with a plurality of bi-directional serial communications lines 18, relay 20, status indicators 22, user's settings keypad 24, optophase detector 26, and filter 28.

FCC regulations require that all flashing lights on a single tower must flash in unison, thereby requiring the units to be synchronized with each other. The operating system for the modules is real-time driven, thus a precise timer, driven by a clock-divided crystal time base, establishes a reference for all internal events. Microcontroller 16 includes a crystal time base for clocking purposes, with the clock being established at 18.432 MHz in the embodiment shown, and in general, the microcontroller uses four such clock cycles to perform a single instruction. At an input rate of 60 Hz, exactly 30,720 real time interrupts are generated each second with software operated counters being used to subdivide this number so that less frequent events are performed on substantially regular time intervals.

Also in communication with microcontroller 16 is high current triac 30, and to prevent damage to the microcontroller through a malfunction or damage to high current triac 30, optotriac, or opto-coupler, 32 is inserted in the circuit between high current triac 30 and microcontroller 16. While microcontroller 16 provides many of the control functions for the light control module, power is supplied from an AC input and is provided as an AC output at the other end thereof Optotriac 32 is used to cleanse the AC wave which passes through high current triac 30 and microcontroller 16, thereby providing a first line of defense for protection of microcontroller 16 and high current triac 30. The optotriac includes a phototransistor and an amplifier to amplify the output of the phototransistor and convert the sinusoidal AC wave into a square wave. As stated optotriac 32 is only a first line of defense, the second line of defense for rejecting amplitude variations and to cleanse the AC wave is the use of an AC zero-crossing filter, designated as filter 28. Using a pair of timers, a best fit transition is selected; for example, if the frequency of the AC input is 70 Hz, then time period between a transition for low to high is approximately 7 milliseconds, thus if the first timer accepts a transition to high, then the second timer must wait the 7 milliseconds before accepting a transition to low. By this structure, the various additional transitions which result from "dirty" AC input are eliminated. An additional protection is the averaging of the trends to obtain the closest approximation of the AC wave's true characteristics during the operation of module 14.

The microcontroller's software is based upon real-time sequences, thus a specific window of time is allocated for every software event. Each incoming AC wave period (within the allowable 45 to 70 Hertz input range) is subdivided into 512 evenly spaced time intervals, or "Phase Steps". A software counter, or "Phase-Pointer", keeps track as each step is performed. As each Phase Step is performed, the exact timing for the next best step time is determined and loaded so that a software interrupt will be generated when the next exact time has come. When not servicing the timed interrupts, the program will repeat its main routines. With an exact input frequency of 70 Hz, there will be exactly 35,840 (70×512) real-time interrupts per second. This interrupt rate will allow for a maximum time-per-step of 128 machine cycles per each interrupt routine. Many interrupt events require much less time than this which will allow the controller to perform other general duties during its normal time in the main routines.

Since the instruction cycle for a single software instruction uses 4 consecutive crystal pulses, the Instructions Per Second rate is $\frac{1}{4}^{th}$ of the crystal speed. With an 18.432 MHz crystal, the time period between interrupts allows for no more than 150 instruction cycles on any single interrupt. An included software-controlled Phase-Locked-Loop compares the crystal driven time base to the main AC wave period to stay in sync with that AC wave and small adjustments in the time base may be made to maintain the synchronization.

One of these tasks to be performed during the interrupts is to poll the data bus, specifically, in the embodiment shown, the Inter-integrated bus (I2C) bus, described hereinbelow, for activity and status. Flags will be set and incoming data can be captured and stored as needed. With this time sensitive information registered it is possible to execute time-consuming data crunching, outside of the real time environment of the interrupts. During each of the 30,720 interrupts that occur per second, there is a reserved window of time for testing new conditions on the I2C bus. Even though this frequency is slower than the actual baud rate being used, it is easily frequent enough to capture an incoming data byte, since a data byte is transmitted over 8 consecutive baud periods. Events within the main routines are still indirectly real-time controlled. The user control keys for example, are read and recorded only during interrupts. In the main routine, decisions are made on actions to take yet they are not actually executed until the next appropriate interrupt occurs.

Across the input of module 14 is a surge suppressor 34, likewise, a surge suppressor 34 is also located on the output of the light control modules, and furthermore, third surge suppressor 34 protects triac 30. Snubber 35 is also located in the circuit across triac 30 to also assist in "cleansing" the voltage across triac 30 to eliminate any voltage spikes.

Relay 20 is provided as a latching relay such that if power is lost to control module 14, any fault indication provided by relay 20 would remain since the relay would be latched in the fault condition. Relay 20 is also used to inform other equipment of a problem with light control module 14. Status indicators 22 and user settings keypad 24 are both located on the exterior housing of light control module 14, as described hereinbelow. It is to be noted that filter 28 may include current sensing transformer 29 with a single winding on the primary side and a plurality of windings on the secondary side to sense the current in circuit 36 after triac 30. Optotriac 32, as mentioned previously, is used to protect high current triac 30 by isolating high current triac 30 from microcontroller 16.

Figure 3:
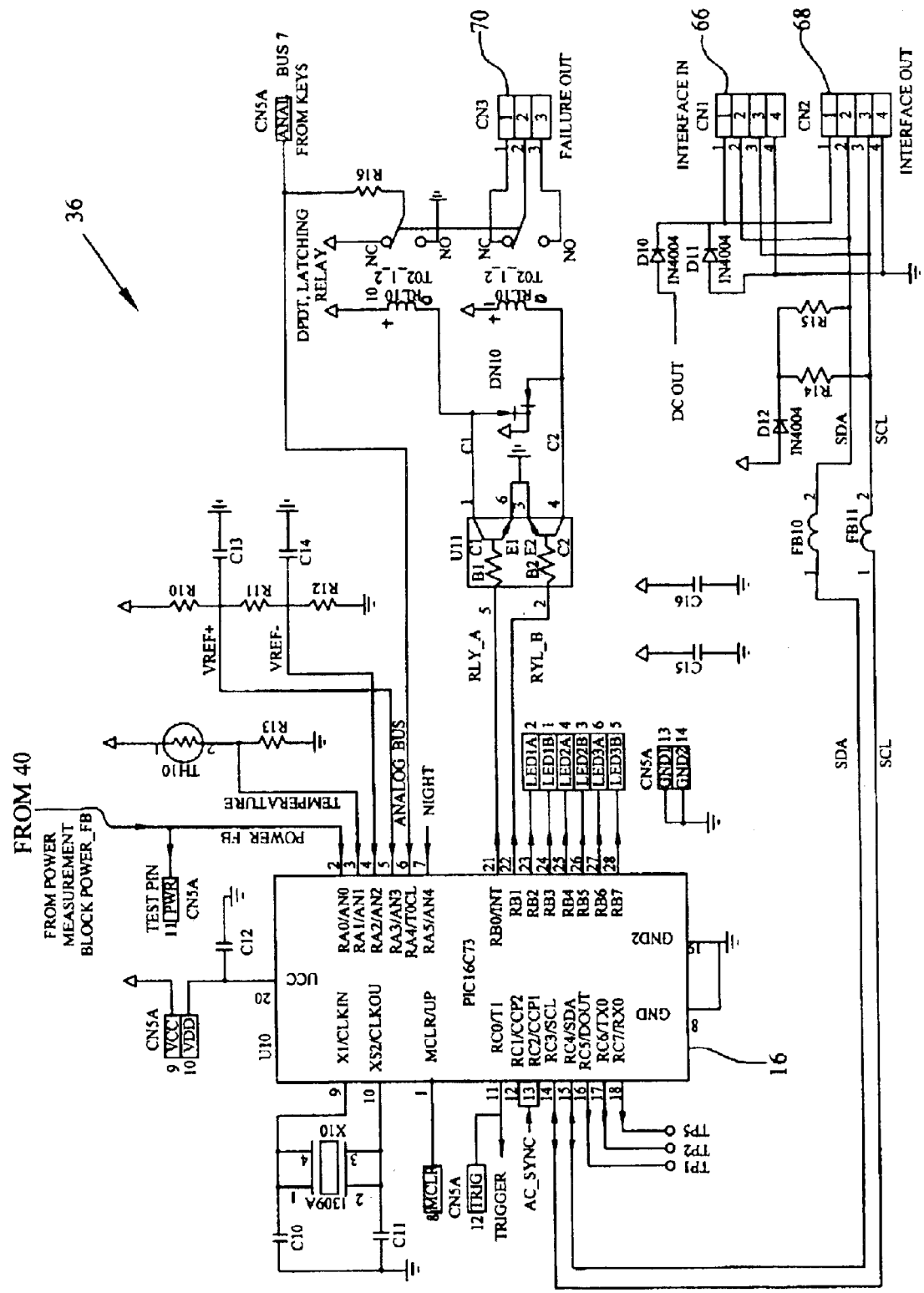
FIG. 3 is a schematic diagram of the control circuit of FIG. 2.

FIG. 3 shows control circuit 36 of light control module 14 is shown. Control circuit 36 is centered around microcontroller 16 which is shown as model PIC16C73; however, microcontroller 16 may be of another known type provides control for module 14. Although control circuit 36 is shown as including certain selected circuit components, such as transistors, diodes, resisters and capacitors, the embodiment shown in FIG. 3 is designed to optimize performance of the exemplary microprocessor which is employed as microcontroller 16. Other arrangements of alternative microprocessors and related circuit components may constitute control circuit 36 and thus may be utilized within light control module 14 to accomplish the same result.

Figure 4:
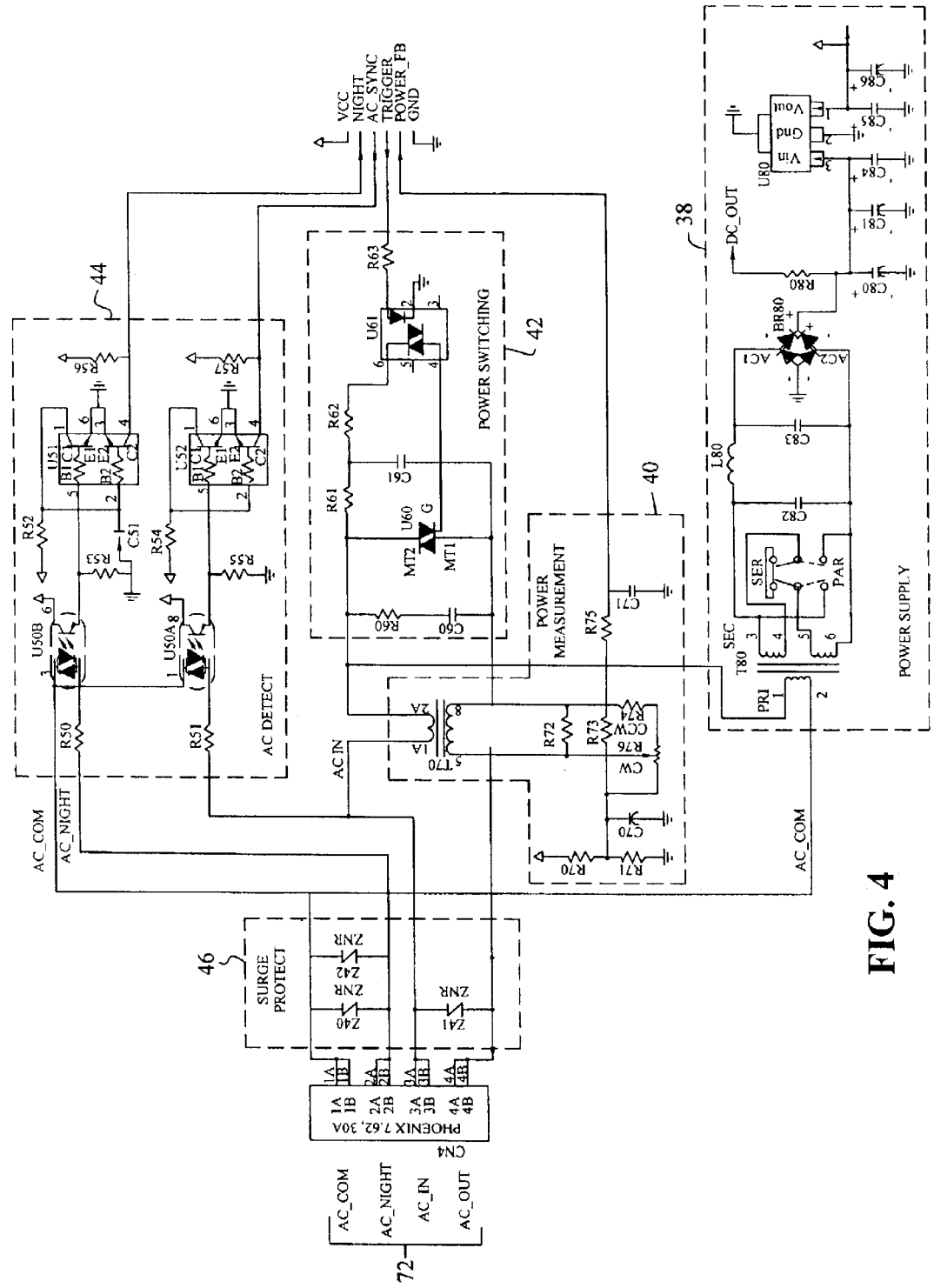
FIG. 4 is a schematic diagram of the power handling circuits of the module shown in FIG. 2.

FIG. 4 shows the various power handling circuits of module 14 as power supply circuit 38, power measurement circuit 40, power switching circuit 42, AC detection circuit 44, and surge protection circuit 46. Power supply circuit 38 includes transformer and switch 48 for providing the option of utilizing a serial or a parallel connection for the power supply. Power measurement circuit 40 is included to ensure that necessary power is being provided to light control module 14 and to light 12. If the power supplied to light 12 falls below a necessary level, light 12 may malfunction or if the power dips low enough, light 12 may go out resulting in a need for notification of a technician or engineer to replace or repair light 12. Power switching circuit 42 is utilized in conjunction with triac 30 for triggering triac 30 to cause conduction to light 12 for the selected light pattern whether it be a flashing light pattern or a steady light pattern. AC detection circuit 44 also works in conjunction with power switching circuit 42 and triac 30 in that AC detection circuit 44 detects whether the power being supplied is on the positive half wave or the negative half wave for conduction and triggering of triac 30, as described hereinbelow. Surge protection circuit 46 is embodied in surge suppressors 34 (FIG. 2) and includes a plurality of Zener diodes.

Figure 5:
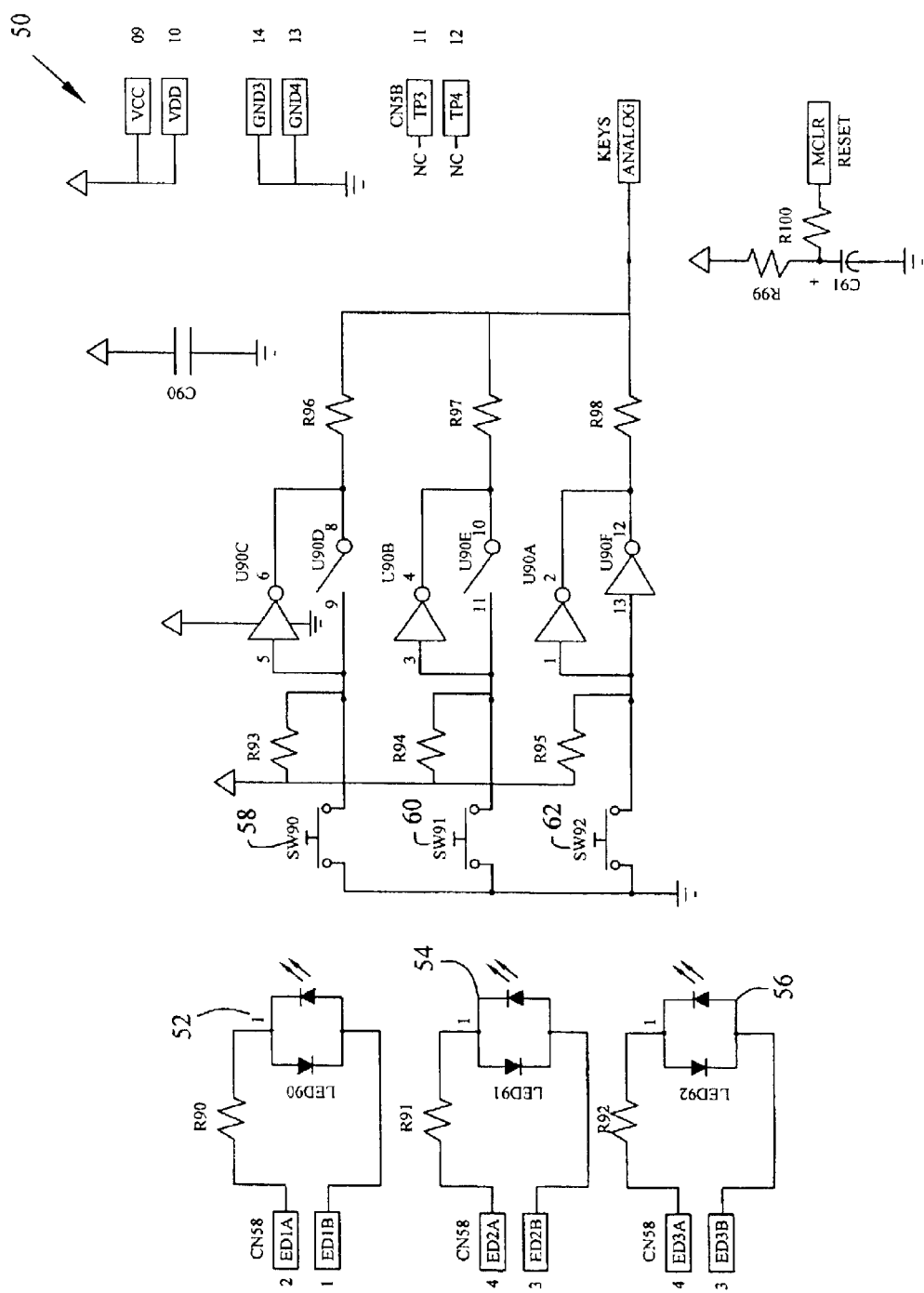
FIG. 5 is a schematic diagram of the status board inputs of the module of FIG. 2.

FIG. 5 shows status and input board 50 for module 14. Status and input board 50 is utilized in conjunction with status indicators 22 and keypad 24 to inform the owner, or operator, of tower 10 as to the conditions of light 12. Status and input board 50 includes connection to three light emitting diodes (LED) 52, 54, and 56, with each LED corresponding to an indicator for power, mode, or testing/calibration on the face of module 14. The input board also includes three switches 58, 60, and 62, which, like LEDs 52, 54 and 56, correspond to one of a power, mode, or test and calibration feature. Each switch is part of user settings keypad 24 which is then in communication with microcontroller 16 for the purposes of control within light control module 14. LEDs 52, 54, and 56 are part of status indicators 22 which are also in communication with microcontroller 16 and receive indications of the status of light control module 14 from microcontroller 16.

Figure 6:
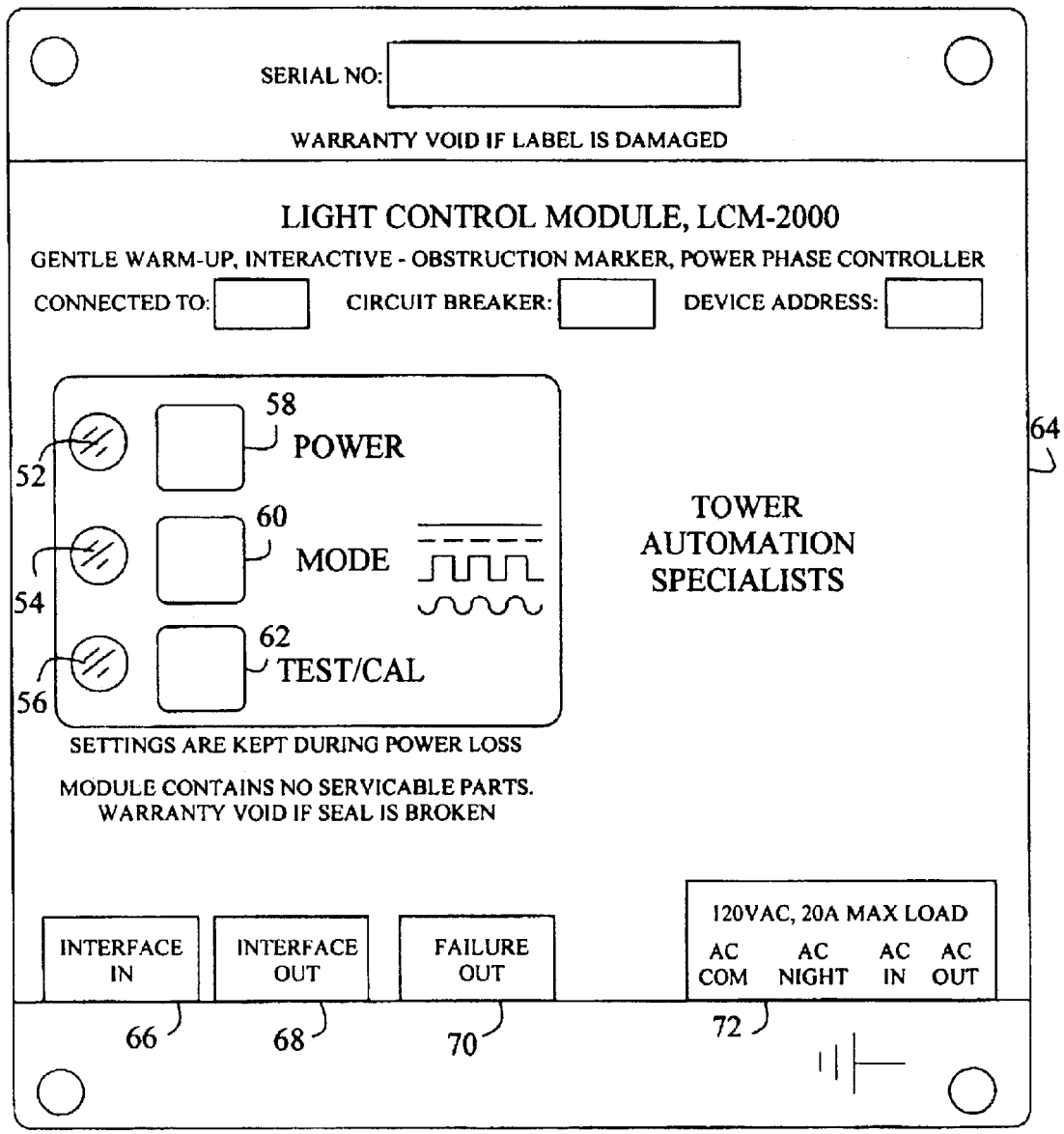
FIG. 6 is a plan view of the exterior of the module case including the output connections to the status board of FIG. 5.

FIG. 6 shows faceplate 64 of module 14. As described above, LEDs 52, 54, and 56 are included on faceplate 64 as are switches 58, 60, and 62. In addition, on faceplate 64 are labels for connections to circuits within module 14 including connections 66 and 68 to provide an interface between a module 14 and another module 14. For example, if it is desired to have one module 14 control each light 12 on a tower 10 with tower 10 having a plurality of lights 12, then a plurality of modules 14 are required. A plurality of modules 14 may be utilized in a master/slave arrangement requiring that at least one module be the master and the other modules 14 be slaves. Modules 14 include communication inputs and outputs 68 (see also FIG. 3) to allow modules 14 to be "daisy chained" together, thereby providing a simple structure for interfacing modules 14. Next on faceplate 64 is failure out connection 70, which provides a connection from module 14 to another piece of equipment which may be located elsewhere to indicate that a failure condition has occurred at a particular light 12 or at a particular module 14. Lastly, on faceplate 64, are a plurality of power connections 72 which are used for AC connections both for providing power and for providing a common ground, which are utilized with the circuits shown in FIG. 4.

Figure 7:
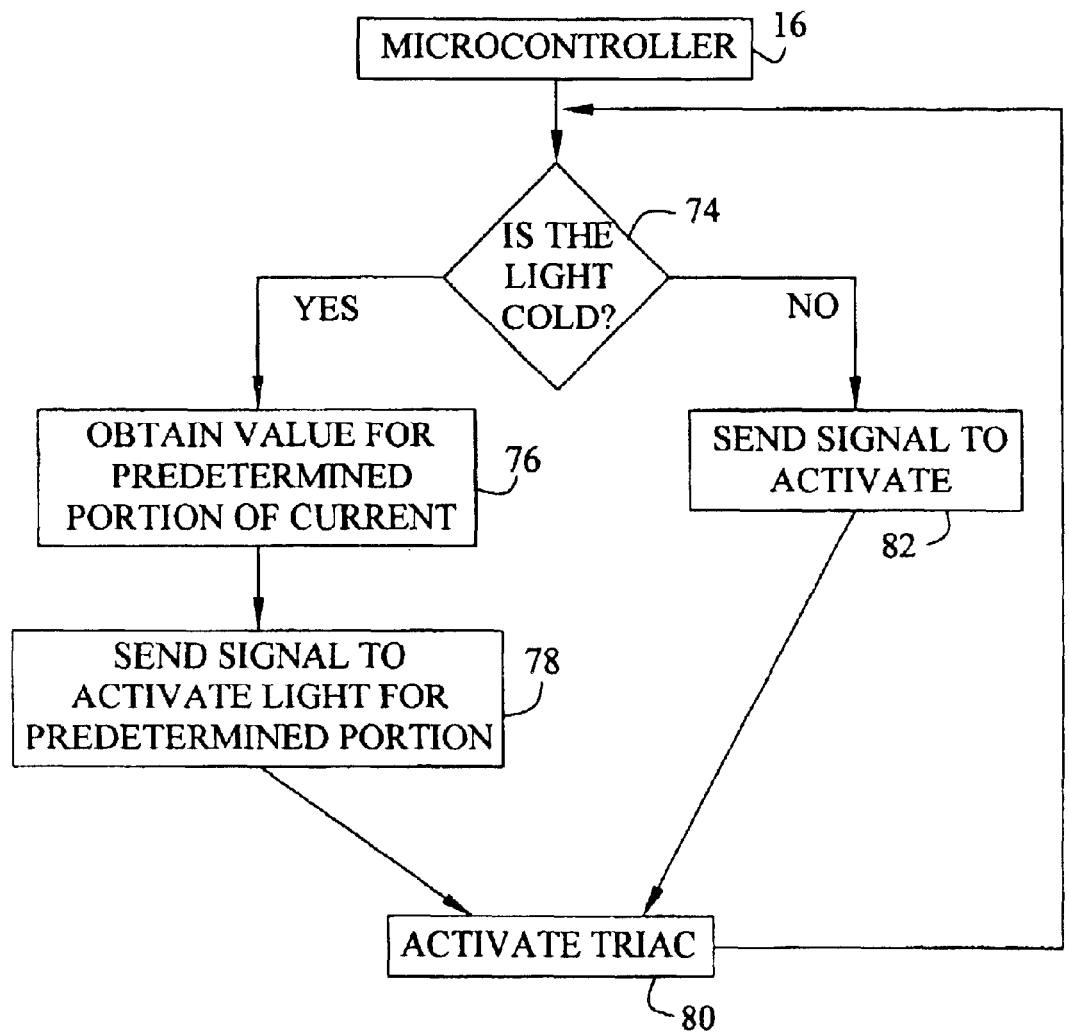
FIG. 7 is a flowchart of the triac operation and the warming of an aviation obstruction light utilizing the module of FIG. 2.

FIG. 7 shows the operation of light control module 14 controlling and monitoring the AC power to lights 12 on a tower 10. The control of light 10 is centered primarily with microcontroller 16 and high current triac 30 with each module 14 being capable of switching the power to light 12 on and off by triggering triac 30 into conduction at a specified time within each AC wave. To trigger triac 30 into full conduction, a brief pulse is applied to the gate of triac 30 during a point within the cycle, and triac 30 will continue conduction even when pulse is removed from the gate of triac 30, thereby allowing light 12 to continue to be lit. The conduction ceases when the wave from the AC power source passes through zero or goes from a positive wave half to a negative wave half at which point light 12 will be turned off. Triac 30 is capable of conducting twice during a single cycle since it utilizes both a positive wave half and a negative wave half unlike a silicone controlled rectifier which only conducts in what it sees as a positive wave half. In order for light control module 14, specifically triac 30 to use both wave halves of the cycle, AC detection circuit 44, part of optophase detector 26, is utilized, as shown in FIG. 4.

Phase detector 26 detects both wave halves of a typical wave from the AC source and converts that to a low voltage square wave output which is at twice the frequency of the AC source, i.e., if a 60 hertz AC source is used, then the square wave output of phase detector 26 would have 120 cycles per second rather than 60. Microcontroller 16 then receives the square wave output from phase detector 26 and utilizes that output for determination of when triac 30 needs to be triggered for operation of light 12 by determining precisely when a zero crossing would occur. Through triggering triac 30 at different times during the cycle, or by triggering it at different points on the square wave output, the time of conduction can be controlled for light 12. For example, if triac 30 is triggered immediately after a zero crossing then light 12 will be on for the full duration of each wave half, thereby providing what appears to be a steady illumination of light 12. However if it is desired to have light 12 flash or a series of lights 12 to flash, then each triac 30 would need to be triggered at different times during the cycle to either lengthen or shorten the time of conduction relative to the other lights 12.

Another capability of each module 14, which relates to utilizing each half of the AC wave, is the capability of "ramping" the voltage to each light. If light 12 is cold (block 74), then microcontroller 16 obtains the valve for the portion of the wave to be conducted (block 76) or the trigger point, and then sends the signal for conduction (block 78). Since triac 30 will either be conducting completely or not conducting at all when activated (block 80), the entirety of the wave from the trigger point to the zero crossing is supplied to light 12. Alternatively, if light 12 is not cold, the activation signal is sent (block 82) and the triac activated (block 80). Considering that an AC wave is just that, a wave, and has a peak which the wave ramps up to and then decreases from, that same wave structure for the power is supplied to light 12 such that the power is ramped up to a peak point and brought back down. By this fading on and off capability, lights 12 are protected from thermal shock and may last for a longer period of time since there is not sudden voltage being applied to a cold filament. Thus lights 12 may have an extended life, reducing the outages to be reported and corrected.

When utilizing a timing feature on the AC cycle to trigger triac 30, timing must be synchronized among a plurality of modules 14 if more than one light 12 is controlled. Within each module 14, specifically within each microcontroller 16, is a timing feature including a clock or a crystal; if one module 14 is a master, then the timing sequence of that module 14 is used by the slave modules for synchronization. The different sequences based upon the timing features and different triggering times for each triac 30 is recorded in a built-in non-volatile memory (not shown) within microcontroller 16. In addition, within light control module 14 is a bulb detection failure feature, which includes filter, or current sensing transformer, 28. The user defines a certain value for the current to be used by a light 12, then the current sensed by filter 28 is compared with that user defined value by microcontroller 16. If the values differ beyond a previously defined tolerance then microcontroller 16 would cause relay 20 to latch and cause one of status indicators 22 to be illuminated to show the fault condition.

Figure 8:
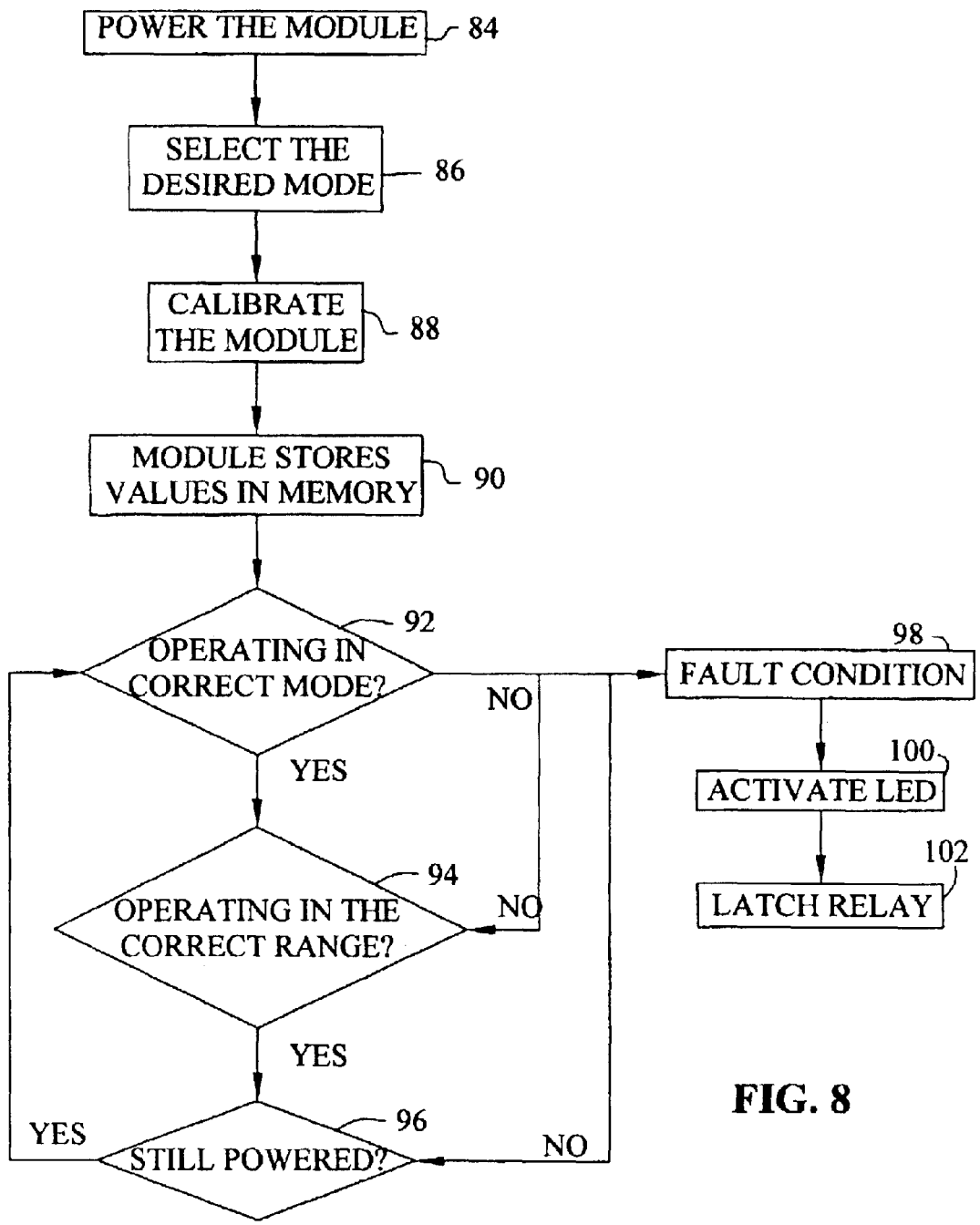
FIG. 8 is a flowchart of the user diagnostic operation of the module of FIG. 2.

As can be seen in FIG. 8, user defined values and controls are necessary for the operation of module 14. Such user defined values may be inputted into module 14 through the switches on faceplace 64. The power switch, presently labeled as switch 58, is utilized for initially powering module 14 after installation (block 84). Mode switch, labeled as 60, is used for determination of which sequence should be used for the particular module 14 for control of light 12 (block 86). Example sequences include a steady sequence, a flashing sequence or a sequence in which the light or light 12 appears to slowly be illuminated to its maximum brightness and then slowly returned to it being turned off and so on and so forth. The test or calibration switch, labeled as switch 62, may be pressed and held by the user to calibrate module 14 to what is considered normal for the light to be controlled (block 88). By pressing and holding switch 62 the current utilized at that time is sensed and is retained within the memory of microcontroller 16 as normal for that particular light 12, as are the other valves (block 90). It is to be noted that the associated LEDs with the power, mode, and testing/calibration switches provide an indication as to whether light 12 and module 14 are functioning correctly. Each LED is a bicolor LED that either may be green indicating normal operation or red to indicate a fault condition. For example, if for some reason light 12 is illuminated even when it should not be, as indicated by an external photo detector, then the power LED would be illuminated red indicating a fault condition (blocks 96, 98, 100). Likewise, if the mode is different from that programmed (blocks 92, 98, 100) or some other fault with the test/calibration occurs (blocks 94, 98, 100) either one of those LEDs would be illuminated red to indicate a fault. By utilizing LEDs, a user operator of tower 10 may quickly determine whether a fault condition occurs by simply viewing the LEDs. With the LEDs illuminated, latch relay 20 is latched, also indicating a fault condition (block 102).

Figure 9:
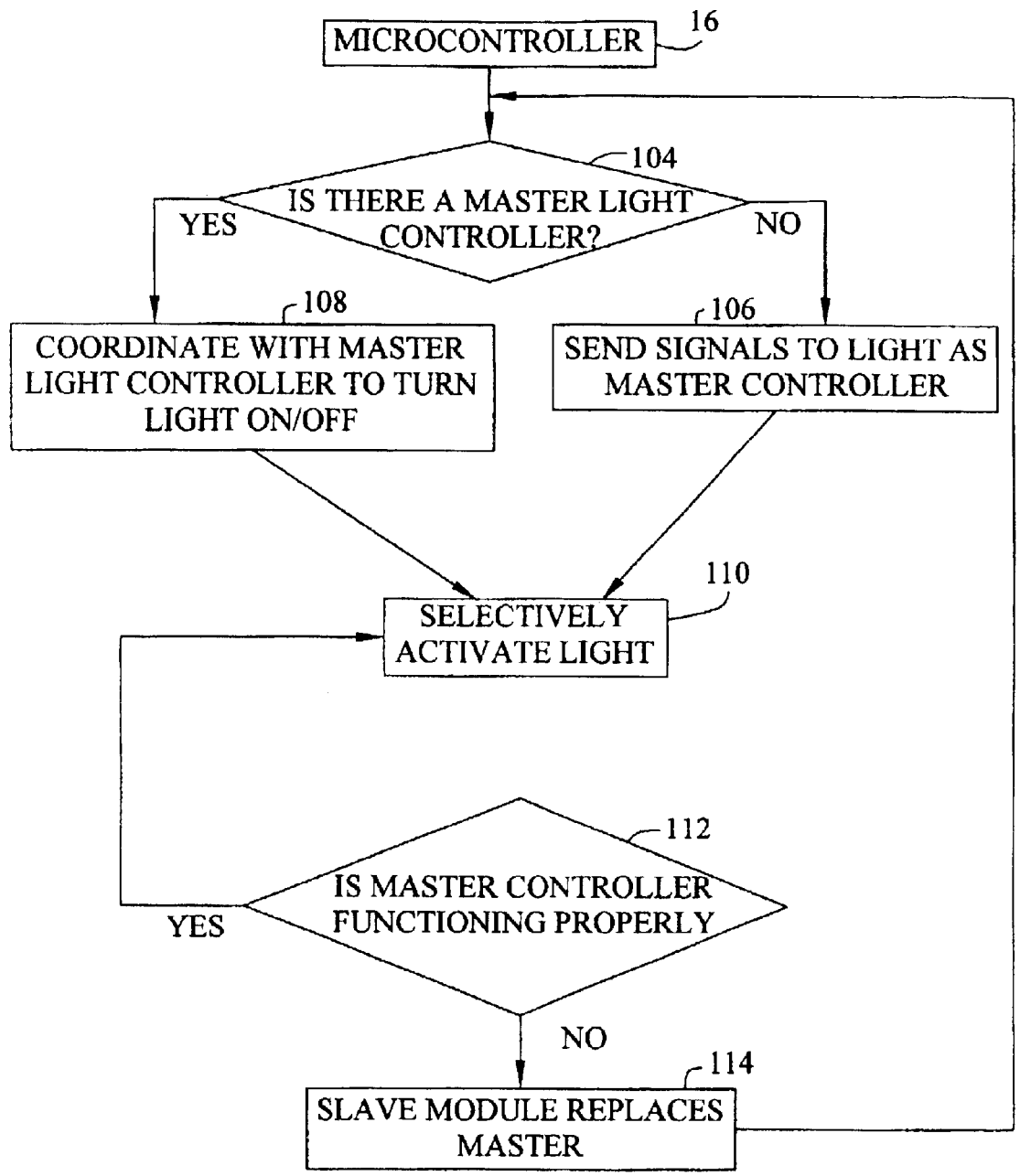
FIG. 9 is a flowchart of the master and slave operation of at least two modules such as the module of FIG. 2.

Since the operation of each module 14 has been described, the power-up of module 14 on installation or restoration of power to the module shall now be described with reference to FIG. 9. If one module 14 is to be installed to control one or more lights 12, then the module is placed in its appropriate location, power is applied, the module 14 attempts to communicate with any other modules 14 to which it may be connected (block 104). If module 14 senses that there are no other modules, then the single module 14 addresses itself as the master module (e.g., as number one in block 106). When more than one module 14 is to be installed, when power is applied to the second module 14, the second module 14 senses (block 104) the master module 14, it will default to act as a slave module (e.g. addressing itself as module number 2 in block 108). In the exemplary embodiment, addressing itself as module number 2, second module 14 defaults to a slave condition and all timing determinations are made by activation signals from module 1 which has become the master module. The installation and powering process continues up to and including an N module, with N representing the total number of modules to be installed. Light 12 is selectively activated whether module 14 is a master or a slave (block 110).

Since each module 14 has the same structure and capabilities, if the master module, or module number 1, is damaged to the point of unusability (block 112) then one of the associated slave modules would sense the loss of master activation signals and become the master module (block 114) and would take over the timing function and all other slave modules would then be synchronized to the timing of activation signals of the new master module. One method of setting the new master module is to have the next addressed module, module number 2, alter its number to 1 and become the new master when the master module, former module number 1, is damaged. Alternatively, modules 14 may have a predetermined master module signal, which is independent of the addressing signal of modules 14.

Each module 14 is protected by surge suppressors 34 such that if one module 14 is struck by lightening or otherwise damaged or disabled in some manner, only that module 14 would need to be replaced or repaired, that is, the other modules 14 would continue functioning as expected. Modules 14 also have a default master module lighting sequence such that if module 14 is disconnected from the other modules 14, but still has power, it would operate independently in a predetermined manner.

In general, each module on the Inter-integrated Circuit (I2C) bus is enabled or disabled from communicating and, as a result, the operating system of each module includes a dedicated status bit to signify whether the routines conducted by that module will or will not require servicing. This bit is identified as the I2C enable bit and is structured such that a "1" signifies I2C communications are enabled or a "0" signifies that the I2C communications are disabled. If the device is disabled then the service routine will not require any servicing, whereas an enabled device will then assume the role of either a master or slave, as described above.

Since each module then assumes the role of a master or slave, an additional bit, designated as a status bit, is used to determine the status of each module. Each module will generally remain enabled as either a master or, for the majority of the modules, a slave module unless conditions change such that a particular module must temporarily become a master. If the slave temporarily becomes a master, then the device will revert once again to the slave state after being finished with the master communication.

Synchronization, or sync, signals are generally expected to arrive at regular 3-second intervals. If no sync signals are detected for several consecutive periods, the conclusion may be drawn that the master module is not transmitting the sync signal and that the next module in the array must convert to a master module and generate the periodic sync signal, which will contain the identity of the originator module.

The general operations of module 14 have been described above; a specific implementation, in particular an implementation of the communications system, associated with module 14 is the Inter-integrated Circuit (I2C) Communications Technique utilizing the I2C bus, also mentioned above. In conjunction with such I2C communications, a chip, specifically model #PIC 16F873 is used as the core of microcontroller 16 in this exemplary embodiment. In general, the I2C bus specification utilizes a physical interface for the bus that includes two open collector lines, one for the clock, referred to as the SCL line, and another for data, referred to as the SDA line. To facilitate the implementation of the I2C structure and the two collector lines, module 14 has two externally accessible parallel connected interface ports with four conductors on each connector, with the pin assignments on the connectors being as follows:

1. +DC power;
2. SCA;
3 SCL; and
4. Chassis ground.

In general, with the implementation, the left hand connector is labeled as an input and the right hand connector is labeled as an output to provide a consistent arrangement for the daisy chain of modules, as described above.

Since all I2C communications are generally transferred on a common bus, only one device can have control of the common bus at any one time, with the one unit being the originator of a communication or the master unit, and all other units, or modules, receiving such communication being the slave units. Different modules may assume the role of a master at differing times during operation of the modules, however, there can be only one master at any one time on the bus.

Figure 10:
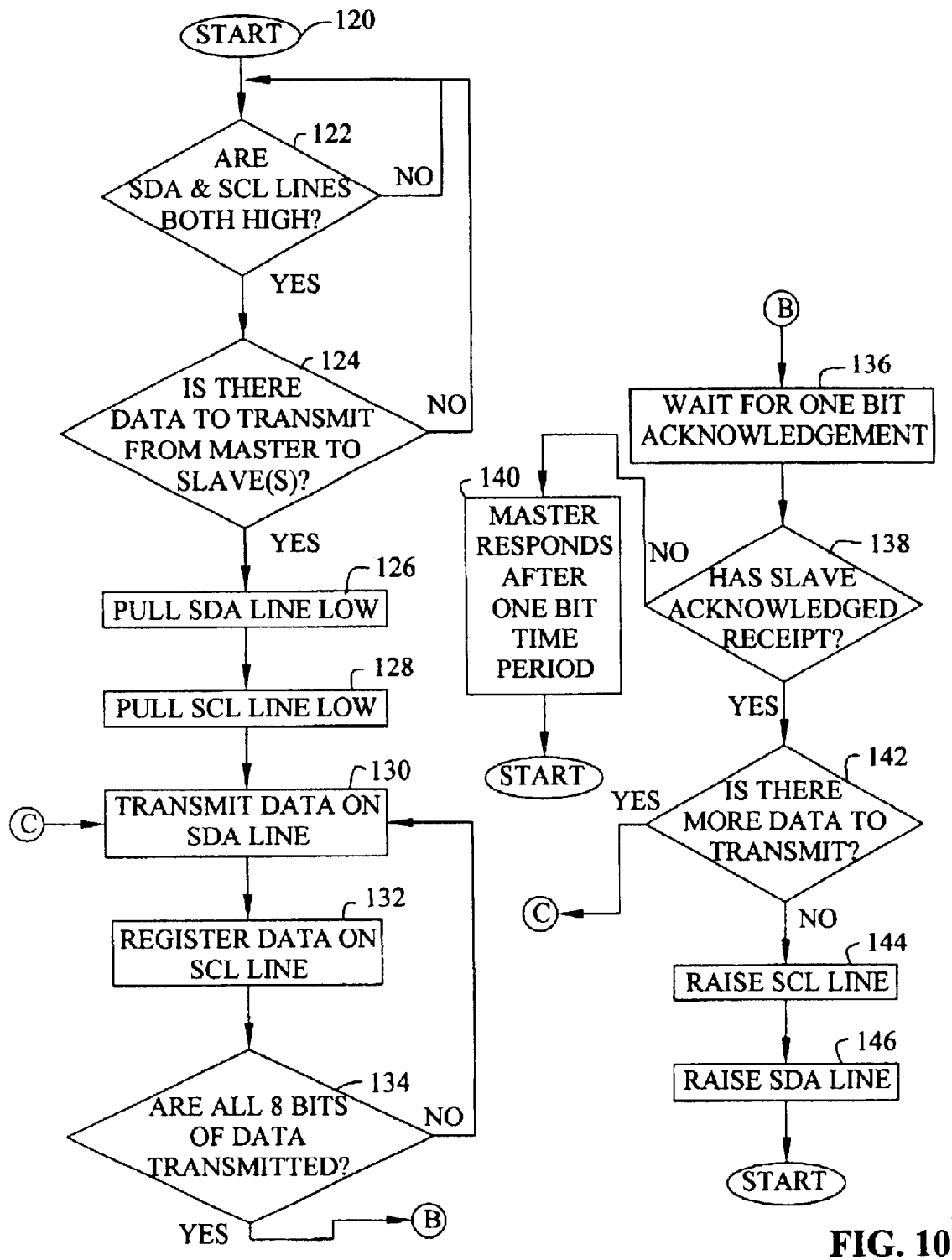
FIG. 10 is a flowchart of the transmission of data between master and slave operation of at least two modules, such as the module of FIG. 2.

FIG. 10 shows the operation of the module when a communication is to be passed from a master to a slave. Start block 120 leads to the decision step of whether the SDA and SCL lines are both biased in the high position (block 122), or are in the idle bus state. A master can begin to perform a communication. If the SDA and SCL lines are not both high, then the module returns to start block 120. If the SDA and SCL lines are both high, then the module proceeds to decision block 124 where the decision of whether there is data to transmit from the master to the slave (or slaves) must be decided. If there is no data to transmit then the module again returns to start block 120.

If there is data to transmit, then a start condition for data transmission is created at function block 126 by first pulling the SDA line low and then at function block 128 by pulling the SCL line low. When this occurs, the slave modules can detect the state transition from an idle state to a start condition and prepare to receive any communications transmitted from the master module. When data is transmitted, a blinded address and command bit to either read or write are sent to the slave modules. The data is sent out serially with the most significant bit first on the SDA line (block 130) and then each individual bit is registered by a cycle, specifically a low high low cycle, on the SCL line (block 132).

After the transmission and registry of a group of eight data bits, there is a one bit time period for an indication of whether the slave modules have received the eight preceding bits. This is accomplished by the module proceeding to determine whether all eight bits of data have been transmitted (block 134). If not, the module continues to transmit the data (block 134); however, if all eight bits of data have been transmitted, then there is the one bit waiting period for acknowledgement (block 136). During the one bit waiting period, the slave is to acknowledge receipt of the data (block 138). If the slave has not acknowledged receipt of all light bits, then the master responds after the one bit time period with an error detection (block 140) after which the module returns to start (block 120). If the slave has acknowledged receipt, then the module proceeds to determine whether there is more data to transmit (block 142).

If there is more data to transmit, then the module transmits the additional data on the SDA line (block 130). If there is no more data to transmit, then a stop condition is created in which case the module raises the SCL line (block 144) and then raises the SDA line (block 146). Afterwards, the module returns to start (block 120). By raising both lines to high, the bus is returned to an idle state.

Figure 11:
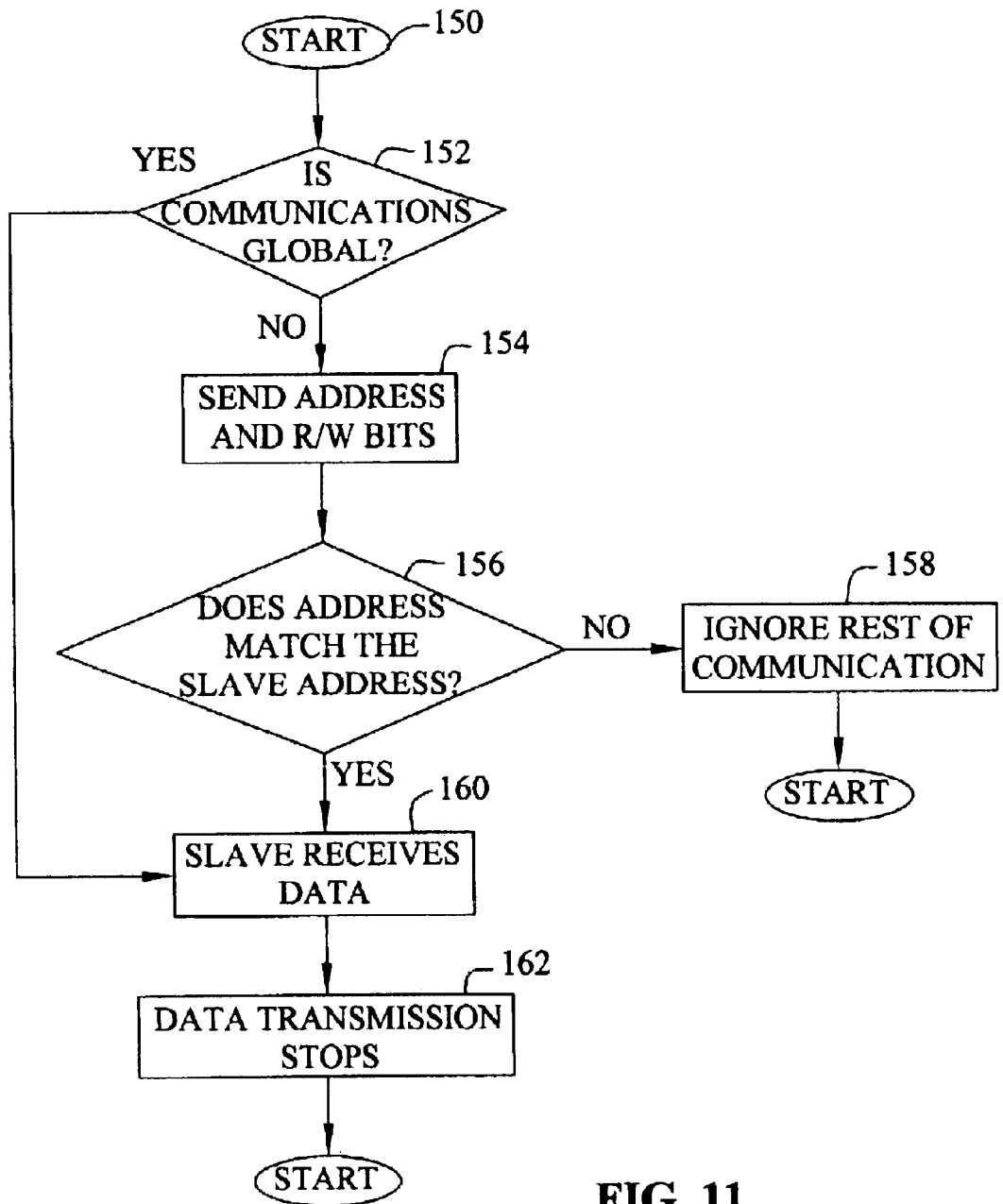
FIG. 11 is a flowchart of an addressing method for the modules, such as the module of FIG. 2.

Each module is required to have its own distinct address to facilitate both a role call of all the slave modules on the bus and to facilitate a master module sending a message to a particular slave module. In addition to each module having a unique address, a universal or global address of all zeros may be used to enable the master module to send a message to all slave modules simultaneously. FIG. 11 shows the basic addressing system of the module. At the start (block 150) the master module starts the addressing process and proceeds to determine whether the communication is to be a global communication or a specifically addressed communication (block 152). If the communication is global, hence the use of an all zero address, then the slave (or slaves) receives the data (block 160). If the communication is not global and is instead addressed to a specific or a group of specific modules, then the master module proceeds to send an address bit to identify the specific module for the communication in addition to a read/write bit (block 154).

After the send of the address bit, a decision must be made as to whether the address bit sent matches the address of the slave module (block 156). If such a match is not made, then the slave module ignores the rest of the communication (block 158) and the master module returns to the start (block 150). If the address bit matches the slave address, then the slave receives data (block 160) and then proceeds to continue to receive the data until the data transmission is stopped (block 162). The data transmission is stopped in the manner described with reference to FIG. 10 by raising the SCL line and then raising the SDA line. After the data transmission is stopped, the modules return to start (block 150).

As described above, incoming data is ignored if an address match does not exist. If a match is made, all incoming data will be stacked into memory for servicing and required operations afterward. A status buffer has been dedicated to keep track of the incoming data string, or the I2C Receive (Rcv) Conditions, with the bits in the status buffer being designated as follows:

Bit-7, Capture_Enable;
Bit-6, Capture_is_Complete;
Bit-5, Capture_in_progress;
Bit-4, Buffer-Is-Full;
Bit-3, Byte counter, most significant bit;
Bit-2, Byte counter;
Bit-1, Byte counter;
Bit-0, Byte counter, least significant bit.

If the Capture_Enable bit is set, and an address match is discovered, a real-time driven, software string-capture will begin in which up to 16 bytes are allowed. The software string-capture includes the following sequence of operations or actions:

1. Set-Capture_in_progress;
2. The latest received byte is saved;
3. The 4-bit byte counter is incremented once;
4. Stop condition is checked. If not found, return to step 2 when next byte arrives. If a Stop is detected, then proceed to step 5;
5. Clear—Capture_in_Progress;
6. Set—Capture_is_Complete;
7. Clear—Capture_Enable.

From the Main program (not the real-time interrupts), a list of condition flags is continuously examined, specifically a scan is made of the Capture_is_Complete bit. If it is found to be set, the newly received data is processed as required and any other required actions are taken. When these actions have been completed, the Capture-Enable bit is set, all other I2C_Rcv_Conditions are cleared, and the device is now ready to capture any new data when it arrives. The time at which this response was taken is saved and compared later to determine recent activity on the bus.

The read/write bit was mentioned with respect to the procedures of FIGS. 10 and 11, the read/write bit is used to indicate whether the rest of the communications sent to the slaves would be a command to write or a command to read in which case the slave would send a string of data back to the master with the master still providing a clock signal. With this structure, in general, a master can command two types of communications: transfer data to the slave or receive requested data from a slave, and a slave, in general, can only receive data from the master or transmit the requested data back to the master. In either case, the master controls the length of the communication by sending the appropriate start and stop conditions.

The Data Read Requests being sent from the master module to the various slave modules have the format of: Start, Addr+Read, N-Bytes, Stop. A master device can request summary performance data from any other specific slave device and up to 16 bytes of data can be read from any slave in this read sequence. A data read sequence is commenced by addressing a specific slave module and by setting the read/write bit to READ, then a list of up to 16 bytes of information will be sent back by the slave module. If the master module only needs one particular piece of information, it must read all bytes from the sequence until reaching the particular byte that is desired. Thus the bytes have been arranged in an order of most useful information first and the least useful information being last. Once the master module has obtained the specific byte desired, the m aster module can then establish a stop condition.

During performance of the above mentioned procedures and sequences, an order for the various status bytes is required. In general, the order of status bytes is as follows:

1. Power and Mode of Operation status;
2. Error Conditions and Watts_L;
3. Watts presently being used (10 bit);
4. Calibrated Watts;
5. Reload Value used for Sync command (normally Zero);
6. Cycle Step counter (Brightness Lookup Pointer) - - - ;
7. - - - ;
8. - - - ;
9. - - - ;
10. - - - ;
11. - - - ;
12. High_Time_H;
13. High_Time_L;
14. Wave_Time_H;
15. Wave_Time_L;
16. Temperature (8 bit).

The above software architecture is adaptable and may be changed or altered to facilitate operations with a particular chip or bus. Furthermore, the above described registers, procedures and sequences are specific to the embodiment shown in accompanying drawings, thus other registers, and specific procedures and sequences may be used in conjunction with the broad procedures herein. The use of different microcontrollers, different frequencies of AC, additional modules, and the like will alter the specific steps taken; however, the broad concepts will remain unaltered.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A lighting control module for at least one aviation obstruction light, comprising:
    a microcontroller having programming for sensing a master light controller such that if a master light controller is sensed, then said microcontroller coordinates activation of the aviation obstruction light with the master light controller, and if a master light controller is not sensed, then said microcontroller sends activation signals as a master light controller; and
    switching means for selectively coupling the aviation obstruction light to a power source, said microcontroller coupled to said switching means and selectively activating the aviation obstruction light.

2. The lighting control module of claim 1, wherein said switching means includes a triac.

3. The lighting control module of claim 1 further comprising protection means disposed intermediate of said microcontroller and said switching means, said protection means structured and adapted to prevent electrical damage to said microcontroller and said switching means.

4. The lighting control module of claim 3, wherein said protection means includes an optocoupler.

5. A light control module for at least one aviation obstruction light, comprising:
    a microcontroller having programming for determining whether the aviation obstruction light is cold; and
    a triac coupled to said microcontroller and selectively coupling a power source and the aviation obstruction light;
    said microcontroller also having programming for selectively activating said triac for only predetermined portions of the current from the power source when the aviation obstruction light is determined to be cold.

6. The light control module of claim 5 further comprising protection means disposed intermediate of said microcontroller and said triac, said protection means structured and adapted to prevent electrical damage to said microcontroller and said triac.

7. The light control module of claim 6, wherein said protection means includes an optocoupler.

8. A method of controlling at least one aviation obstruction light, comprising:
    providing a programmable microcontroller;
    sensing by the microcontroller that a master light controller is present;
    coordinating activation of the aviation obstruction light with the master light controller;
    sensing by the microcontroller that a master light controller is not present;
    sending activation signals as a master light controller.

9. The method of claim 8 further comprising, after sensing that a master light controller is present:
    sensing by the microcontroller that other controllers are present;
    addressing the microcontroller as the next controller numerically;
    sensing by the microcontroller that there is only a master light controller;
    addressing the microcontroller as the second controller.

10. A method of controlling at least one aviation obstruction light, comprising:
    providing a programmable microcontroller;
    providing a triac coupled between a power source and the aviation obstruction light;
    determining by the microcontroller whether the aviation obstruction light is cold; and
    activating the triac for predetermined portions of the current from the power source when the aviation obstruction light is determined to be cold.

11. The method of claim 10 further comprising:
    providing a user input means and a status indicator;
    transmitting the status of the aviation obstruction light;
    receiving user directed input signals; and transmitting those input signals to the aviation obstruction light.

12. A lighting control module for at least one aviation obstruction light, comprising:

a microcontroller;

status indicators in communication with said microcontroller, each of said status indicators including a light emitting diode and associated with one of a power, a mode and a calibration switch;

switching means for selectively coupling the aviation obstruction light to a power source, said microcontroller coupled to said switching means and selectively activating the obstruction light;

said microcontroller having programming for receiving and transmitting signals between a user and the aviation obstruction light such that the status of the light is communicated to the user through light emitting diode and the performance characteristics of the light are changed due to user directed input.

13. The lighting control module of claim 12 further comprising user input means coupled to said microcontroller, said user input means transmitting user directed input to said microcontroller.

14. The lighting control module of claim 13, wherein said user input means further comprises user notification means receiving status information from the aviation obstruction light.

15. The lighting control module of claim 12 further comprising user notification means coupled to said microcontroller and receiving status information from the aviation obstruction light.

16. A lighting control module for at least one aviation obstruction light, said module comprising:

an enclosure;

a microcontroller disposed within said enclosure;

switching means for turning the light on and off, said switching means coupled with said microcontroller and adapted to be coupled to an electrical power source; and user-operated input switches mounted on said enclosure and adapted to receive user entered input signals and communicate said signals to said microcontroller, said input switches including a power, a mode and a calibrated switch.

17. The lighting control module of claim 16, wherein an optocoupler is disposed electrically intermediate of said microcontroller and said switching means.

18. The lighting control module of claim 16, wherein each said input switch is associated with at least one visual status indicator.

19. The lighting control module of claim 18 wherein said visual status indicator includes a bicolor light emitting diode.

20. The lighting control module of claim 16 wherein said switching means includes a triac.

* * * * *

UNITED STATES PATENT AND TRADEMARK OFFICE
CERTIFICATE OF CORRECTION

PATENT NO. : 6,900,742 B2
DATED : May 31, 2005
INVENTOR(S) : Charles B. Chesney, II It is certified that error appears in the above-identified patent and that said Letters Patent is hereby corrected as shown below:

Column 16,
Line 15, delete "calibrated" and insert -- calibration --.

Signed and Sealed this

Twentieth Day of September, 2005

JON W. DUDAS
*Director of the United States Patent and Trademark Office*